(12) United States Patent
Kutzkov et al.

(10) Patent No.: US 10,970,296 B2
(45) Date of Patent: *Apr. 6, 2021

(54) SYSTEM AND METHOD FOR DATA MINING AND SIMILARITY ESTIMATION

(71) Applicant: NEC CORPORATION, Tokyo (JP)

(72) Inventors: Konstantin Kutzkov, Heidelberg (DE); Mohamed Ahmed, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 16/513,803

(22) Filed: Jul. 17, 2019

(65) Prior Publication Data

US 2019/0340176 A1   Nov. 7, 2019

Related U.S. Application Data

(63) Continuation of application No. 14/704,998, filed on May 6, 2015, now Pat. No. 10,402,414.
(Continued)

(51) Int. Cl.
*G06F 16/00* (2019.01)
*G06F 16/2458* (2019.01)
(Continued)

(52) U.S. Cl.
CPC ...... *G06F 16/2465* (2019.01); *G06F 16/2457* (2019.01); *G06F 16/24568* (2019.01)

(58) Field of Classification Search
CPC ........... G06F 16/2465; G06F 16/24568; G06F 16/2457
See application file for complete search history.

(56) References Cited

U.S. PATENT DOCUMENTS 8,041,694 B1   10/2011   Bayardo et al.
8,667,385 B1    3/2014   Mui et al.
(Continued)

OTHER PUBLICATIONS

Brendan O'Connor, Cosine similarity, Pearson correlation, and LOS coefficients, AI and Social Science, posted Mar. 13, 2012, retrieved on Aug. 1, 2018, retrieved from the Internet <URL:https://brenocon.com/bloq/2012/03/cosine-similaritv-pearson-coiTelation-and-ols-coefficients/> (Year: 2012).*
(Continued)

*Primary Examiner* — Tyler J Torgrimson
(74) *Attorney, Agent, or Firm* — Leydig, Voit & Mayer, Ltd.

(57) ABSTRACT

A method for data mining includes receiving input vectors and converting them into corresponding sketch feature vectors each having a number of output dimensions that is less than a number of dimensions of the corresponding input vector. Each sketch feature vector is compared against parameters and a decision loop generates results of similarities based on the comparisons. An estimate of cosine similarity or Pearson correlation of the input vectors is obtained based on estimates of an inner product of two input vectors and a 2-norm vector of an input vector. The estimates are obtained using respective hash tables for each input vector having a number of entries up to the number of output dimensions of the sketch feature vector. A decision is provided based on the results of the similarities and an application of the data mining such that the decision is implemented by the application.

20 Claims, 3 Drawing Sheets

Related U.S. Application Data

(60) Provisional application No. 62/109,694, filed on Jan. 30, 2015.

(51) Int. Cl.
  *G06F 16/2455* (2019.01)
  *G06F 16/2457* (2019.01)

(56) References Cited

U.S. PATENT DOCUMENTS

| | | | |
|---|---|---|---|
| 2006/0101060 A1* | 5/2006 | Li | G06F 16/583 |
| 2007/0124698 A1 | 5/2007 | Majumder | |
| 2007/0245119 A1 | 10/2007 | Hoppe | |
| 2008/0104078 A1 | 5/2008 | Eshghi et al. | |
| 2008/0240566 A1 | 10/2008 | Thint | |
| 2009/0063294 A1 | 3/2009 | Hoekstra | |
| 2010/0223250 A1 | 9/2010 | Guha | |
| 2010/0268661 A1 | 10/2010 | Levy et al. | |
| 2013/0159352 A1* | 6/2013 | Bern | G06F 16/184 707/802 |
| 2014/0358857 A1 | 12/2014 | Chambliss et al. | |
| 2015/0127925 A1 | 5/2015 | Follett et al. | |
| 2016/0189204 A1 | 6/2016 | Ma et al. | |

OTHER PUBLICATIONS

U.S. Appl. No. 14/704,998, filed May 6, 2015.

Achlioptas, et al., "Two-Locus Association Mapping in Subquadratic Time", Proceedings of the $17^{th}$ ACM SIGKDD international conference on Knowledge discovery and data mining, pp. 726-734, Dec. 2011.

Bachrach, et al. "Sketching Techniques for Collaborative Filtering", Proceeding IJCAI'09 Proceedings of the $21^{st}$ international joint conference on Artificial intelligence, pp. 2016-2021, Dec. 2009.

Broder, et al., "Min-Wise Independent Permutations", Journal of Computer and System Sciences, pp. 327-336, Dec. 1998.

Charikar, et al., "Finding Frequent Items in Data Streams", Theoretical Computer Science, vol. 312, Issue 1, Jan. 26, 2004, pp. 3-15.

Charikar, "Similarity Estimation Techniques from Rounding Algorithms", Proceeding STOC '02 Proceedings of the thirty-fourth annual ACM symposium on Theory of computing, pp. 380-388, Dec. 2002.

Cormode, et al., "Sketching Streams Through the Net: Distributed Approximate Query Tracking", Proceeding VLDB '05 Proceedings of the $31^{st}$ international conference on very large data bases, pp. 13-24, Dec. 2005.

Wolfram Language & System Documentation Center, "Distance and Similarity Measures", pp. 1-2, Dec. 1, 2014.

Ekstrand, et al., "Collaborative Filtering Recommender Systems", Journal Foundations and Trends in Human-Computer Interaction, vol. 4, issue 2, Feb. 2011, pp. 81-173.

Brendan O'Connor, "Cosine similarity, Pearson correlation, and OLS coefficients", AI and Social Science, Mar. 13, 2012, pp. 1-6.

* cited by examiner

100

Process vector x = (14, -2, 1, 80, 3, 23, 4, 40, -57, 32, 2, 17, -95, 62, -36, 43) in a streaming fashion. (Vector is indexed from 0, elements are provided in random order.)

(3, 80) (i.e., x(3) = 80). h(3) = 1, s(3) = -1:

|  | -80 |  |  |  |  |  |  |
|---|---|---|---|---|---|---|---|

(7, 40) (i.e., x(7) = 40). h(7) = 6, s(7) = 1:

|  | -80 |  |  |  |  | 40 |  |
|---|---|---|---|---|---|---|---|

(0, 14) (i.e., x(0) = 14). h(0) = 2, s(0) = 1:

|  | -80 | 14 |  |  |  | 40 |  |
|---|---|---|---|---|---|---|---|

(12, -95) (i.e., x(12) = -95). h(12) = 5, s(12) = -1:

|  | -80 | 14 |  |  | 95 | 40 |  |
|---|---|---|---|---|---|---|---|

(4, 3) (i.e., x(4) = 3). h(4) = 1, s(4) = -1:

|  | -77 | 14 |  |  | 95 | 40 |  |
|---|---|---|---|---|---|---|---|

(14, -36) (i.e., x(14) = -36). h(14) = 0, s(14) = 1:

| -36 | -77 | 14 |  |  | 95 | 40 |  |
|---|---|---|---|---|---|---|---|

Fig. 2

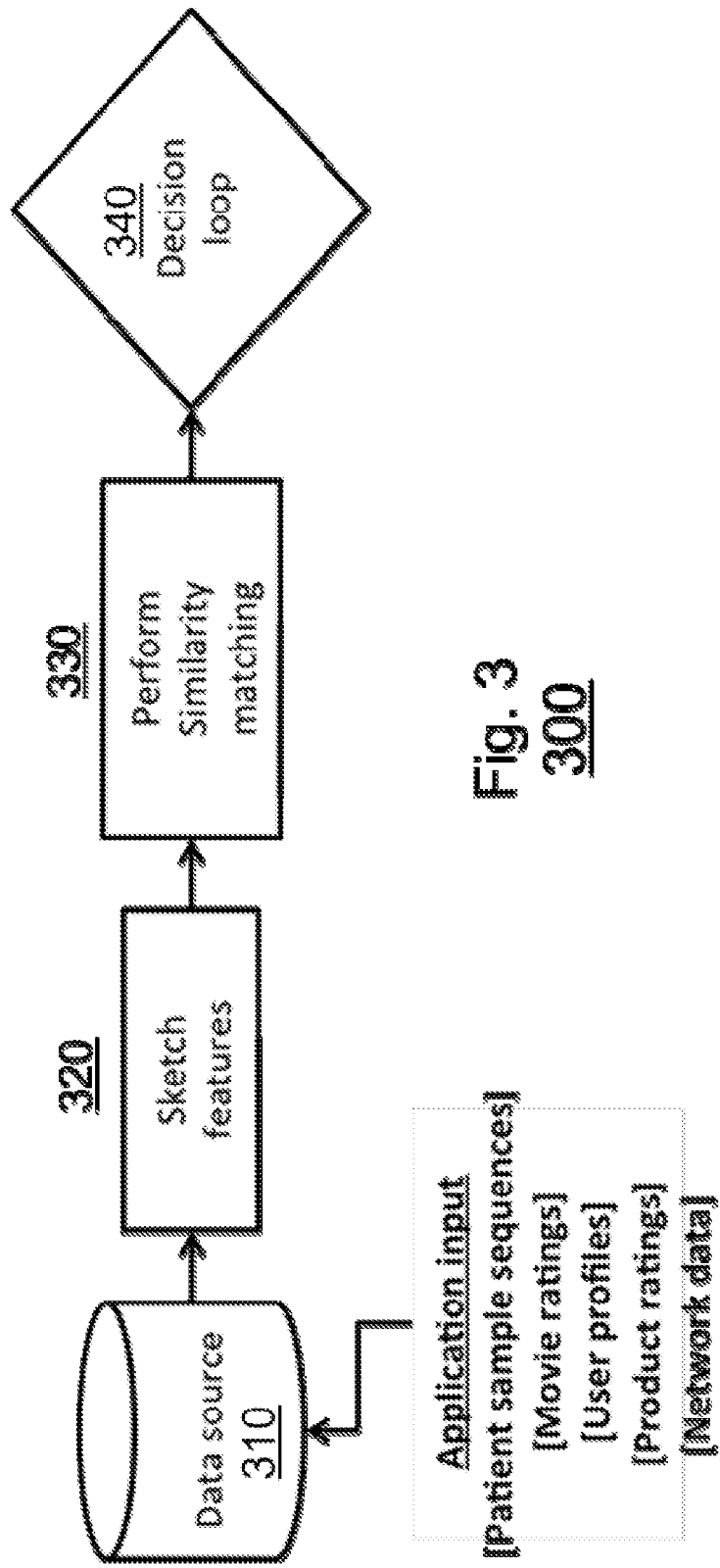

SYSTEM AND METHOD FOR DATA MINING AND SIMILARITY ESTIMATION

CROSS-REFERENCE TO PRIOR APPLICATIONS

This is a continuation of U.S. patent application Ser. No. 14/704,998 filed on May 6, 2015 and claims priority to U.S. Provisional Patent Application No. 62/109,694, filed on Jan. 30, 2015, the entire disclosures of both of which applications are hereby incorporated by reference herein.

FIELD

The present invention relates to a system and method for data mining and similarity estimation which is particularly applicable to massive datasets revealed in a streaming fashion.

BACKGROUND

Detecting similar objects is a core component in numerous computer science applications. Concrete examples include, but are not limited to, the detection of similar documents in large corpora for plagiarism detection, clustering similar emails according to keywords for spam detection, detecting defective genes that appear to contribute as combinations to certain diseases, collaborative filtering in recommender systems where users are grouped according to similar interests, etc.

There are different similarity measure definitions that have been applied. See <<http://reference.wolfram.com/language/guide/DistanceAndSimilarityMeasures.html>> (accessed Jan. 29, 2015) for an overview. Some of the similarity measure definitions like Hamming distance, Jaccard similarity, Dice similarity, etc, assume binary data as input. For many problems however, this assumption is not justified and one needs to handle weighted features. Arguably, the three most widely used similarity measures for weighted data are Euclidean distance, cosine similarity and Pearson correlation.

For certain applications like recommender systems and genetic data mining, the established similarity measures are cosine similarity and Pearson correlation. See Michael D. Ekstrand, John T. Riedl and Joseph A Konstan, Collaborative Filtering Recommender Systems, Foundations and Trends in Human-Computer Interaction, Vol. 4, No. 2 (2010) as an example.

Formally, cosine between two objects x and y is defined as $$\cos(x, y) = \frac{\sum_{i=1}^{n} x_i y_i}{\|x\|\|y\|}$$

where $x_i$ denotes the i-th feature of object x and $$\|x\| = \sqrt{\sum_{i=1}^{n} x_i^2}$$

is the 2-norm of the vector a.

Pearson correlation is defined as $$\rho(x, y) = \frac{\sum_{i=1}^{n} (x_i - \bar{x})(y_i - \bar{y})}{\|\bar{x}\|\|\bar{y}\|}$$

where $\bar{x} = \left(\sum_{i=1}^{n} x_i\right) / n$ and $\|\bar{x}\| = \sqrt{\sum_{i=1}^{n} (x_i - \bar{x})^2}$ The problem to compute the similarity between two objects by the above definitions is trivial if it is possible to store the objects in main memory. However, for massive datasets with high-dimensional objects, it is often the case that it is not possible to store all of the objects in main memory. Therefore, one aims to efficiently compute compact sketches or summaries of the objects that will lead to considerable space savings.

In the following, it is assumed that objects are described by vectors and the terms object and vector are used interchangeably. It is also assumed that an input vector is provided as a stream of (index, value) pairs with no particular order.

Previous approaches for similarity estimation include min-wise independent permutations (see Andrei Z. Broder, Moses Charikar, Alan M. Frieze, Michael Mitzenmacher, Min-Wise Independent Permutations (1998)) for Jaccard similarity and a random hyperplane algorithm (see Moses Charikar, Similarity Estimation Techniques from Rounding Algorithms (2002)) for the estimation of the angle between vectors revealed in a streaming fashion. The former applies only to binary data, and the latter suffers from higher processing time per element which makes it impractical for high speed data streams. Count-Sketch has also been applied to inner product estimation (see Graham Cormode, Minos Garofalakis, Sketching Streams Through the Net: Distributed Approximate Query Tracking, VLDB (2005), pp. 13-24) which is closely related cosine similarity estimation. Count-Sketch is also described in Moses Charikar, Kevin Chen, Martin Farach-Colton, Finding Frequent Items in Data Streams, Theor. Comput. Sci. 312(1) 3-15 (2004). To the best of the inventors' knowledge, no sketching technique has been proposed to Pearson correlation estimation.

SUMMARY

In an embodiment, the present invention provides a method for data mining. A plurality of input vectors are received and converted into a corresponding plurality of sketch feature vectors, wherein each of the plurality of sketch feature vectors has a number of output dimensions that is less than a number of dimensions of a corresponding one of the input vectors. Each of the plurality of sketch feature vectors is compared against a set of parameters and a decision loop generates results of similarities based on the comparisons. An estimate of cosine similarity or Pearson correlation of the input vectors is obtained based on estimates of an inner product of two of the input vectors and a 2-norm vector of one of the input vectors. The estimates are obtained using respective hash tables for each of the input vectors having a number of entries up to the number of output dimensions of the sketch feature vectors. A decision is provided based on the results of the similarities and an application of the data mining such that the decision is implemented by the application.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 shows an example of updating a hash table according to an embodiment of the present invention.

FIG. 3 schematically shows a system for similarity estimation according to an embodiment of the present invention.

DETAILED DESCRIPTION

Figure 1:
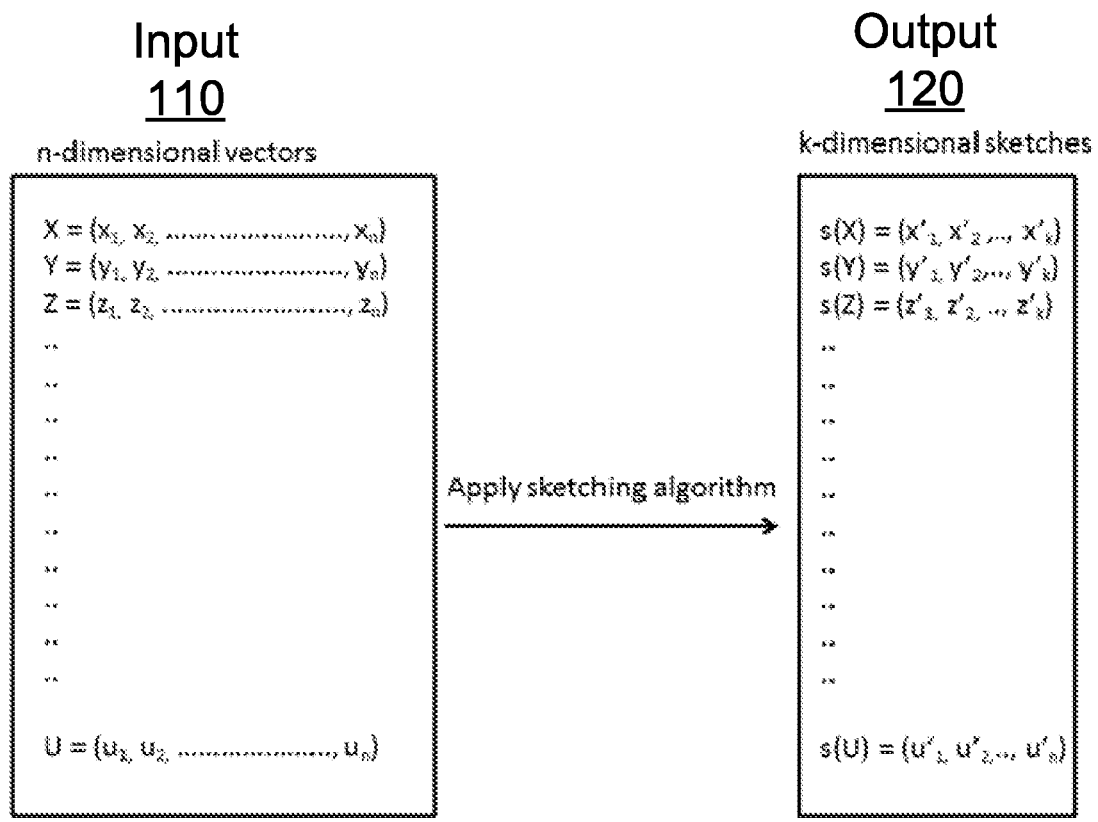
FIG. 1 shows the overall structure of a sketching algorithm according to an embodiment of the present invention.

Embodiments of the present invention provide a new system and method for sketching the input vectors revealed in a high-speed streaming fashion. The system according to an embodiment, compared to current state-of-the-art systems, provides significantly improved data processing, reducing significantly the processing time required per element, stores a compact representation of the input vectors and also estimates the 2-norm of each vector. Furthermore, significant space savings of 80% or more can also be advantageously achieved. Moreover, the accuracy of the results of the estimations are significantly improved as compared to the state-of-the-art, which have a number of disadvantages.

In an embodiment of the present invention, Count-Sketches are combined in a novel manner for the estimation of both the inner product of two vectors and the 2-norm of a vector. Having these three estimates makes it possible to compute an estimation of cosine similarity. In the following, it is first described how the system works for cosine similarity estimation and then described how the system is extended, in an embodiment, to Pearson correlation estimation.

FIG. 1 shows the overall structure of a sketching algorithm according to an embodiment of the present invention. In a sketch generator 100, a plurality of n-dimension vectors (X, Y, Z, U) are received as input 110, and a plurality of k-dimension vectors (s(X), s(Y), s(Z), s(U)) are generated as output sketches 120 by the sketch generator 100 applying sketching algorithm.

For cosine similarity, a single hash table $H_x$ is provided for each vector x. In each hash table $H_x$ up to k entries can be stored. Let s: $[n] \rightarrow \{-1, 1\}$. For a new entry update $(i, x_i)$, the hash table is updated as $H_x[j] += s(i)x_i$ where $j=h(i)$ for a suitably defined hash function h: $[n] \rightarrow [k]$. See FIG. 2 for a simple example with n=15 and k=9. A counter norm is maintained and updated as norm$+=x_i * x_i$. Clearly, after processing all $x_i$ it holds $\|x\| = \sqrt{\text{norm}}$.

The inner product of two vectors is estimated as $Z = \sum_{j=1}^{k} H_x[j] * H_y[j]$. It can be shown that $E[Z] = xy$, i.e., an unbiased estimator of xy is obtained. For a suitable choice of the hash function h and large enough k, it is possible to bound the variance and obtain a precise estimation of xy. Intuitively, the larger hash table used, the better the estimates which were obtained.

Therefore, an estimate of cosine similarity between vectors x, y is provided. The sketch of vector x can be used in order to estimate the inner product with all other vectors in the database.

For Pearson correlation, the approach for cosine similarity estimation is extended as follows. Ideally, if the value $\tilde{x} = (\sum_{i=1}^{n} x_i)/n$ is known in advance, it would be possible to simply apply the already-described algorithm. Instead, additionally a variable that computes $= \sum_{i=1}^{n} x_i/n$ is maintained. Also, for each cell $H_x[j]$, the total contribution is computed from the function s, i.e., signs_j$=\sum_{i=1}^{n} I(h(i)=j))s(i)$ where I is an indicator variable that evaluates which of x's indices are hashed to $H_x[j]$. After processing the stream, updates are made for each Hx[j]$+=(-$signs_j$)*$avg. One can formally prove that this yields an identical result if the vector (x1$-\tilde{x}$, x2$-\tilde{x}$, . . . , xn$-\tilde{x}$) is sketched. Since $\sum_{i=1}^{n} (x_i-\tilde{x})^2 = \sum_{i=1}^{n} x_i^2 - 2\tilde{x}\sum_{i=1}^{n} x_i + n\tilde{x}^2$, it is possible to obtain an approximation of Pearson correlation in the very same way as for cosine similarity.

As an example of one concrete application of one embodiment of the method, consider the problem of mining similar features that describe users and advertisements in a large scale stream. In this setting, users and advertisements are described by profiles. For example, user profiles include information like age, gender, location, browsing history etc. Ads are described by features like language, keywords, text analysis of the landing page. The goal is to detect similarities between features like 'male' and 'cars' that say that male users are more likely to be interested in ads about cars.

In state-of-the-art recommender systems, an item i, e.g., a book, movie, news article, is recommended to a user u if another user v has rated positively item i and u and v have shown similar preferences in the past. Here, similar preferences are defined by the ratings users give to items. For example, if two users have highly rated the same set of books, then their cosine and Pearson similarity will be close to 1. In large-scale recommender systems, such as those used by online shops or video systems, ratings are produced in a streaming fashion without any particular order, for example users sporadically rating the videos they watch or the objects they buy. Furthermore, in typically large-scale real world deployments, it is infeasible to store and process information for all ratings of users. Therefore, one is interested in storing only a sketch of the ratings for each user, and applying the methods according to the embodiments detailed herein to evaluate the similarity of the user to others. Unlike the methods presented herein, current state-of-the-art work achieves sketching only for Jaccard similarity and only considers which items users have rated, not how they were rated.

In genetic data mining, one is interested in detecting pairs of defect SNPs (Single Nucleotide Polymorphism) that are positively or negatively correlated with a certain disease, e.g. diabetes type-2 (c.f., Panagiotis Achlioptas, Bernhard Schölkopf, Karsten M. Borgwardt: Two-Locus Association Mapping in Subquadratic Time KDD (2011), pp. 726-734). The input consists of cases and controls, i.e., people who have the disease and people who don't. Naïve approaches require the generation of all pairs of SNPs, which is intractable as there are millions of different SNPs. Therefore, embodiments of the streaming approach presented herein can be advantageously applied to evaluate the correlation between SNPs and diseases.

FIG. 3 schematically shows an exemplary system according to an embodiment of the invention. The system can be made up of a computer or computational processing unit, a server or a network of computers and/or servers, which apply the sketching algorithm to preferably streaming data from a data source 310, which is, for example, stored on or available via a network.

According to an embodiment, the data mining function with sketch generation is implemented via a method. The method includes receiving, by a data source 310, various data, such as in the form of vectors (X, Y, Z, U). The sketch feature generator 320 performs the sketching as illustrated in the embodiments above, where the output sketch vectors have lower number of dimensions than the number of dimensions in corresponding input vector of the data source 310. The similarity comparator 330 performs similarity comparison and/or matching on the sketched features. The decision loop 340 generates results of similarities based on the similarity comparison and/or matching, continuously and/or as data becomes available.

According to an embodiment, a system 300 includes a data source 310, a sketch feature generator 320, a similarity comparator 330, and a decision loop 340. The data source 310 is configured to receive various data, such as in the form of vectors (X, Y, Z, . . . , U). The sketch feature generator 320 is configured to perform the sketching as illustrated in the embodiments above, where the output sketch vectors have lower number of dimensions than the number of dimensions in corresponding input vector of the data source 310. The similarity comparator 330 is configured to perform similarity comparison and/or matching on the sketched features. The decision loop 340 is configured to generate results of similarities based on the similarity comparison and/or matching, continuously and/or as data becomes available.

According to an embodiment, the data source 310 may be implemented via a database stored on a server, or a real time data collection device. The sketch feature generator 320, the similarity comparator 330, and the decision loop 340 may be each implemented via a computer or computational processing unit executing software stored on non-transitory computer readable medium, or via a firmware or a hardware circuitry configured to perform the algorithm functions as described herein. Additionally, the data source 310, the sketch feature generator 320, the similarity comparator 330, and the decision loop 340 may be implemented together as a single unit or a single device, integrated on a single semiconductor die or a single chip with multiple semiconductor dies.

According to an embodiment, the sketch feature generator 320 is configured to convert the plurality of input vectors into a corresponding plurality of normal vectors.

According to an embodiment, the corresponding plurality of normal vectors include a plurality of 2-norm vectors.

According to an embodiment, the data source 310 is configured to receive the plurality of input vectors as a stream of the input vectors in real time.

According to an embodiment, the sketch feature generator 320 converts the stream of the input vectors into the corresponding plurality of sketch feature vectors in an order corresponding to an order of the stream of the input vectors.

According to an embodiment, the system 300 further includes a memory configured to store the corresponding plurality of sketch feature vectors that are converted by the sketch feature generator 320 from the plurality of input vectors.

According to an embodiment, the memory is configured to store a corresponding plurality of normal vectors that are converted by the sketch feature generator 320 from the plurality of input vectors.

Similarity matching is performed on the sketch features and a decision loop is performed to evaluate similarities and provide a decision based on the similarities and the application. The application input or data depends on the application. Applications are also differentiated by the decision loop. For example, a recommender system may use as input product rating from users, and evaluate the similarity between users purchases in order to recommend new products to users.

Embodiments of the present invention advantageously provide for the following:
1) A novel sketching technique for summarizing vectors that allows the efficient estimation of cosine similarity and Pearson correlation between vectors.
2) Handling of massive data streams in real time.
3) Possible use cases are finding users with similar preferences for building large scale recommender systems and analyzing user-advertisement interaction in a streaming setting.

In an embodiment, the method comprises:
1) Compactly representing objects as feature vectors;
2) Collecting the feature vectors;
3) Creating feature sketches to summarize the stream; and
4) Evaluating the similarity between feature vectors.

Examples of concrete, specific and particularized applications include:
1) Recommender systems;
2) Genetic data mining; and
3) User-advertisement matching in a streaming setting.

For example, an embodiment of the present invention can work in the sales prediction setting. The product HML by NEC CORP. automatically extracts various factors affecting sales of items, such as the days of the, weather, temperature, popularity trend, etc. in order to predict sales and optimize ordering. This and similar information can then be used to evaluate similarities, for example among product types, to provide a more robust system and allow for further decisions, predictions and recommendations than before.

For the applications listed above, embodiments of the present invention significantly outperform state-of-the-art systems, which either only apply to binary data and/or have larger processing time per element. The present solution is especially advantageous if the absolute values of the features adhere to a skewed distribution as opposed to a normal distribution or, in other words, where the vector elements do not have the same expected value.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for data mining, comprising:
receiving a plurality of input vectors;
converting the plurality of input vectors into a corresponding plurality of sketch feature vectors, wherein each of the plurality of sketch feature vectors has a number of output dimensions that is less than a number of dimensions of a corresponding one of the input vectors;
comparing each of the plurality of sketch feature vectors against a set of parameters and generating, by a decision loop, results of similarities based on the comparisons, wherein an estimate of cosine similarity or Pearson correlation of the input vectors is obtained based on estimates of an inner product of two of the input vectors and a 2-norm vector of one of the input vectors, the estimates being obtained using respective hash tables for each of the input vectors having a number of entries up to the number of output dimensions of the sketch feature vectors; and
providing a decision based on the results of the similarities and an application of the data mining such that the decision is implemented by the application.

2. The method according to claim 1, wherein the converting further converts each of the input vectors into a normal vector.

3. The method according to claim 2, wherein the normal vector is in each case a 2-norm vector.

4. The method according to claim 1, wherein the plurality of input vectors is received by the data source as a stream of the input vectors in real time.

5. The method according to claim 4, wherein the stream of the input vectors are converted into the corresponding plurality of sketch feature vectors in an order corresponding to an order of the stream of the input vectors.

6. The method according to claim 5, further comprising storing, in a physical memory device, the corresponding plurality of sketch feature vectors that are converted from the plurality of input vectors.

7. The method according to claim 6, wherein the memory device further stores a corresponding plurality of 2-norm vectors that are converted from the plurality of input vectors.

8. The method according to claim 1, wherein the application is one of detection of plagiarism, spam detection, disease correlation, collaborative filtering, recommendation of a product, or prediction of sales.

9. The method according to claim 1, wherein the application is detection of defect single nucleotide polymorphisms (SNPs), the decision is a correlation of the defect SNPs with a certain disease, and the plurality of input vectors include cases and controls for patients who do and do not have the certain disease.

10. The method according to claim 8, wherein the application is the recommendation of a product, the decision is a targeted product advertisement, and the plurality of input vectors include user profiles, purchases of the users and corresponding product ratings of the users.

11. The method according to claim 8, wherein the application is the prediction of sales, the decision is an ordering of products, and the plurality of input vectors include sales numbers and at least one of days of the week and weather.

12. The method according to claim 1, further comprising storing, in a physical memory device, the corresponding plurality of sketch feature vectors that are converted from the plurality of input vectors, wherein the plurality of input vectors are not stored for implementing the decision.

13. The method according to claim 1, wherein, for a new entry update for one of the input vectors, a hashing function is used to determine which one of the entries of the hash table is used to reflect a value of the new entry update.

14. A computer system for data mining, comprising memory and one or more hardware processors, wherein the one or more hardware processors, alone or in combination, are configured to provide for execution of a method comprising:
receiving a plurality of input vectors;
converting the plurality of input vectors into a corresponding plurality of sketch feature vectors, wherein each of the plurality of sketch feature vectors has a number of output dimensions that is less than a number of dimensions of a corresponding one of the input vectors;
comparing each of the plurality of sketch feature vectors against a set of parameters and generating, by a decision loop, results of similarities based on the comparisons, wherein an estimate of cosine similarity or Pearson correlation of the input vectors is obtained based on estimates of an inner product of two of the input vectors and a 2-norm vector of one of the input vectors, the estimates being obtained using respective hash tables for each of the input vectors having a number of entries up to the number of output dimensions of the sketch feature vectors; and
providing a decision based on the results of the similarities and an application of the data mining such that the decision is implemented by the application.

15. The computer system according to claim 14, wherein the plurality of input vectors are received in streaming fashion in real time.

16. The computer system according to claim 15, wherein the system is configured to convert the stream of the input vectors into the corresponding plurality of sketch feature vectors in an order corresponding to an order of the streaming.

17. The computer system according to claim 14, wherein the application is one of detection of plagiarism, spam detection, disease correlation, collaborative filtering, recommendation of a product and prediction of sales.

18. The computer system according to claim 14, wherein the system is configured to store, in a physical memory device, the corresponding plurality of sketch feature vectors that are converted from the plurality of input vectors, wherein the plurality of input vectors are not stored for implementing the decision.

19. The computer system according to claim 14, wherein, for a new entry update for one of the input vectors, a hashing function is used to determine which one of the entries of the hash table is used to reflect a value of the new entry update.

20. A tangible, non-transitory computer-readable medium having instructions stored thereon which, upon execution by memory and one or more processors which, alone or in combination, are configured to provide for execution of a method comprising:
receiving a plurality of input vectors;
converting the plurality of input vectors into a corresponding plurality of sketch feature vectors, wherein each of the plurality of sketch feature vectors has a number of output dimensions that is less than a number of dimensions of a corresponding one of the input vectors;

comparing each of the plurality of sketch feature vectors against a set of parameters and generating, by a decision loop, results of similarities based on the comparisons, wherein an estimate of cosine similarity or Pearson correlation of the input vectors is obtained based on estimates of an inner product of two of the input vectors and a 2-norm vector of one of the input vectors, the estimates being obtained using respective hash tables for each of the input vectors having a number of entries up to the number of output dimensions of the sketch feature vectors; and providing a decision based on the results of the similarities and an application of the data mining such that the decision is implemented by the application.

* * * * *